(12) United States Patent
Kurauchi

(10) Patent No.: US 10,415,460 B2
(45) Date of Patent: Sep. 17, 2019

(54) CONTROL DEVICE FOR AN INTERNAL COMBUSTION ENGINE

(71) Applicant: Honda Motor Co.,Ltd., Tokyo (JP)

(72) Inventor: Atsushi Kurauchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 59 days.

(21) Appl. No.: 15/800,078

(22) Filed: Nov. 1, 2017

(65) Prior Publication Data

US 2018/0163615 A1    Jun. 14, 2018

(30) Foreign Application Priority Data

Dec. 12, 2016    (JP) .................................. 2016-240699

(51) Int. Cl.
| | |
|---|---|
| *F02B 37/18* | (2006.01) |
| *F02D 41/00* | (2006.01) |
| *F02D 23/00* | (2006.01) |
| *F02D 41/02* | (2006.01) |
| *F02D 41/20* | (2006.01) |

(52) U.S. Cl.
CPC ........ *F02B 37/183* (2013.01); *F02D 41/0007* (2013.01); *F02D 23/00* (2013.01); *F02D 41/0225* (2013.01); *F02D 2041/2027* (2013.01); *F02D 2200/101* (2013.01); *Y02T 10/144* (2013.01)

(58) Field of Classification Search
CPC ............... F02B 37/183; F02D 41/0007; F02D 41/0225; F02D 2041/2027; F02D 2200/101; Y02T 10/144
USPC ................................................ 60/602, 605.2
See application file for complete search history.

(56) References Cited

U.S. PATENT DOCUMENTS

| | | | |
|---|---|---|---|
| 2001/0016795 A1* | 8/2001 | Bellinger | B60W 10/06 701/53 |
| 2008/0066723 A1* | 3/2008 | Eiraku | F02B 39/16 123/564 |

(Continued)

FOREIGN PATENT DOCUMENTS

JP    2014-227954    12/2014

OTHER PUBLICATIONS

"Office Action of Japan Counterpart Application," with machine English translation thereof, dated Jul. 10, 2018, p. 1-p. 9.

*Primary Examiner* — Patrick D Maines
*Assistant Examiner* — Dapinder Singh
(74) *Attorney, Agent, or Firm* — JCIPRNET

(57) ABSTRACT

A control device for an internal combustion engine, in which vibration of a waste gate valve in a fully closed state and disadvantages caused due to the vibration thereof while the internal combustion engine is running are prevented, and valve opening responsiveness of the waste gate valve can be improved. In a control device for an internal combustion engine, an opening degree of a waste gate valve 14 is controlled by controlling an electrification duty ratio Iduty of the motor 31. In addition, a fully closed period duty ratio IdFC, which is an electrification duty ratio Iduty when the opening degree of the waste gate valve 14 is controlled to be in a fully closed state, is controlled such that the fully closed period duty ratio IdFC becomes smaller when a detected engine speed NE of an internal combustion engine (1) increases (Step 7 in FIG. 5, FIG. 7).

4 Claims, 5 Drawing Sheets

(56) References Cited

U.S. PATENT DOCUMENTS

2011/0314807 A1* 12/2011 Karnik ............... F02B 37/183
  60/602
2016/0010541 A1   1/2016 Wang et al.

* cited by examiner

CONTROL DEVICE FOR AN INTERNAL COMBUSTION ENGINE

CROSS-REFERENCE TO RELATED APPLICATION

This application claims the priority benefit of Japan application serial no. 2016-240699, filed on Dec. 12, 2016. The entirety of the above-mentioned patent application is hereby incorporated by reference herein and made a part of this specification.

BACKGROUND OF THE INVENTION

Field of the Invention

The present invention relates to a control device for an internal combustion engine having a waste gate valve which is provided in a bypass passage bypassing a turbine of a supercharger supercharging intake air and regulates supercharging pressure generated by the supercharger.

Description of Related Art

Patent Document 1 discloses a control device for an internal combustion engine as an example of known control devices in the related art. The internal combustion engine is mounted in a vehicle as a driving source and includes a waste gate valve including an electric actuator. In this vehicle, idling stop control for automatically stopping the internal combustion engine is executed when predetermined automatic stop conditions are satisfied. In addition, in this control device, the waste gate valve is maintained in a fully closed state due to electrification of the actuator while the internal combustion engine is at an automatic stop.

PRIOR ART DOCUMENT

Patent Documents

[Patent Document 1] Japanese Unexamined Patent Application, First Publication No. 2014-227954

SUMMARY OF THE INVENTION

As in the above-described control devices in the related art, when a waste gate valve is to be maintained in a fully closed state while an internal combustion engine is at an automatic stop, generally, an electrification amount of an actuator is increased and the waste gate valve is strongly pressed to a fully closed position, in order to reliably prevent vibration of the waste gate valve caused due to the influence of the vibration of the internal combustion engine when the internal combustion engine is restarted from the automatic stop state, and to prevent generation of noise, deterioration of a valve body, and the like caused due to vibration of the waste gate valve. The same reason can also apply to a case in which the waste gate valve is controlled to be in a fully closed state in order to obtain desired supercharging pressure while the internal combustion engine is running. Consequently, vibration of the waste gate valve and disadvantages thereof are prevented.

However, while the internal combustion engine is running as described above, when the electrification amount of the actuator is increased in order to maintain the waste gate valve in a fully closed state, there is a possibility that not only will consumption of electricity by the actuator increase but also a significant counter electromotive force will be generated in the actuator. Therefore, when the waste gate valve is opened from the fully closed state, it takes a longer time to eliminate the significant counter electromotive force, and particularly, the operation of starting valve-opening is likely to be delayed. Accordingly, responsiveness of a valve opening operation (hereinafter, will be referred to as "valve opening responsiveness") deteriorates. As a result, the increased supercharging pressure cannot be promptly lowered, and thus, for example, there is a possibility that overshooting of the supercharging pressure exceeding an upper limit value will occur.

The present invention has been made in order to solve the foregoing problems, and an object thereof is to provide a control device for an internal combustion engine, in which vibration of a waste gate valve in a fully closed state and disadvantages caused due to the vibration thereof while the internal combustion engine is running are prevented, and valve opening responsiveness of the waste gate valve can be improved.

In order to achieve the object, according to the invention of claim 1 in this application, there is provided a control device for an internal combustion engine having a supercharger which supercharges intake air (turbocharger 12 of an embodiment (hereinafter, the same will apply throughout this application)), and a waste gate valve 14 which is provided in a bypass passage 11 bypassing a turbine 121 of the supercharger and regulates supercharging pressure generated by the supercharger. The control device includes engine speed detecting unit (engine speed sensor 24) for detecting an engine speed NE of an internal combustion engine 1, an electric actuator (motor 31) for driving the waste gate valve 14, and a control unit (ECU 20, FIG. 5) for controlling an opening degree (valve opening degree WGO) of the waste gate valve 14 by controlling an electrification amount (electrification duty ratio Iduty) of the actuator. The control unit controls a fully closed period electrification amount, which is an electrification amount of the actuator when the opening degree of the waste gate valve 14 is controlled to be in a fully closed state, such that the fully closed period electrification amount becomes smaller when the detected engine speed NE of the internal combustion engine 1 increases (Step 7 in FIG. 5, FIG. 7).

In this configuration, the opening degree of the waste gate valve is controlled by controlling the electrification amount of the actuator. In addition, when the opening degree of the waste gate valve is controlled to be in the fully closed state, the electrification amount (fully closed period electrification amount) at that time is controlled to be smaller when the engine speed of the internal combustion engine increases.

Generally, the characteristics of vibration of a waste gate valve in a fully closed state vary due to the engine speed of the internal combustion engine. The lower the engine speed, the more easily the waste gate valve vibrates. Therefore, when the fully closed period electrification amount is controlled as described above and the engine speed of the internal combustion engine is low, the fully closed period electrification amount is increased and a pressing force pressing the waste gate valve to a fully closed position is increased. Accordingly, the waste gate valve can be prevented from vibrating. Therefore, disadvantages caused due to vibration of the waste gate valve, for example, generation of noise and deterioration of the waste gate valve and the like caused due to contact with other members, can be prevented. In addition, when the engine speed of the internal combustion engine is high, the fully closed period electrification amount is reduced and a pressing force to the waste gate valve is reduced. Thus, it is possible to suppress consumption of electricity of the actuator and to prevent vibration of the waste gate valve and disadvantages caused due to the vibration thereof.

In addition, when the engine speed of the internal combustion engine increases, the supercharging pressure further increases. Accordingly, the valve opening responsiveness of the waste gate valve required to lower the increased supercharging pressure becomes high. Therefore, when the engine speed of the internal combustion engine increases, the fully closed period electrification amount is reduced and a counter electromotive force generated in the actuator is controlled in advance to be in a reduced state. Thus, it is possible to obtain higher valve opening responsiveness required for the waste gate valve and to improve the valve opening responsiveness of the waste gate valve.

According to the invention of claim 2, the control device for an internal combustion engine according to claim 1 further includes load detecting unit (intake air amount sensor 22) for detecting a load (intake air amount GAIR) on the internal combustion engine 1. The control unit also controls the fully closed period electrification amount in accordance with the detected load on the internal combustion engine (Step 7 in FIG. 5, FIG. 6).

The characteristics of vibration of the waste gate valve and the required valve opening responsiveness vary not only due to the engine speed of the internal combustion engine but also in accordance with the load on the internal combustion engine. For example, when the engine speed of the internal combustion engine is low, a higher load causes the waste gate valve to vibrate more easily. In addition, in a case in which the engine speed of the internal combustion engine is high, when the load increases, the valve opening responsiveness required for the waste gate valve increases due to an increase of the supercharging pressure. In view of this, according to the configuration described above, the fully closed period electrification amount is controlled in accordance with not only the engine speed of the internal combustion engine but also the detected load on the internal combustion engine. Thus, it is possible to more preferably achieve effects of preventing vibration of the waste gate valve and improving the valve opening responsiveness in accordance with an actual load on the internal combustion engine.

According to the invention of claim 3, in the control device for an internal combustion engine according to claim 1 or 2, the internal combustion engine 1 is connected to a stepped automatic transmission (transmission 52). The control device further includes the gear stage acquiring unit (gear stage sensor 27) for acquiring a gear stage set in the automatic transmission. The control unit also controls the fully closed period electrification amount in accordance with the acquired gear stage (Step 7 in FIG. 5, FIG. 6).

The valve opening responsiveness required for the waste gate valve varies depending on the gear stage of the automatic transmission. For example, particularly when a shift change is carried out on a low-speed gear side, high acceleration performance is required and the supercharging pressure is required to be promptly increased and lowered in accordance therewith. Therefore, the valve opening responsiveness required for the waste gate valve further increases. In view of this, according to the configuration described above, the fully closed period electrification amount is also controlled in accordance with the acquired gear stage of the automatic transmission. Thus, it is possible to suitably achieve the valve opening responsiveness of the waste gate valve matching an actual gear stage.

DESCRIPTION OF THE EMBODIMENT

Figure 1:
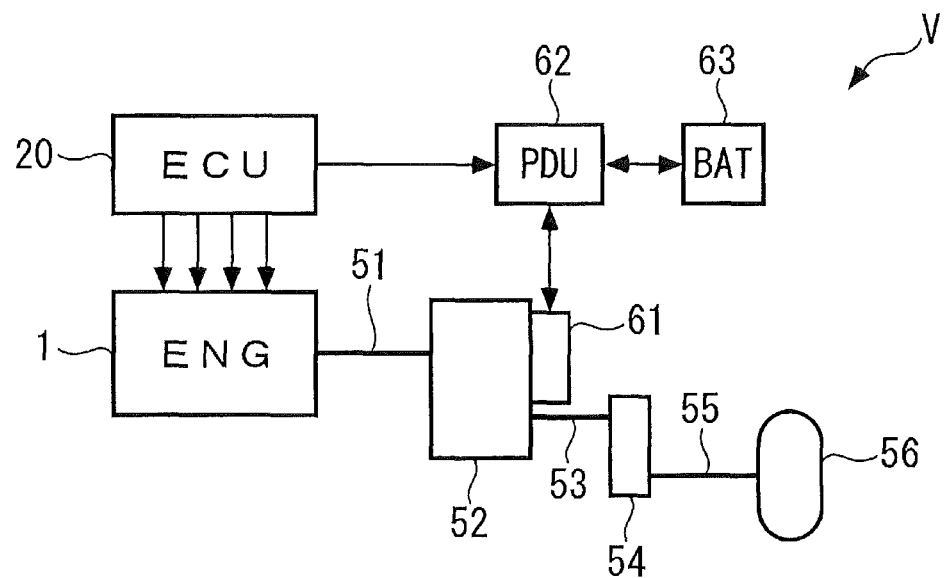
FIG. 1 is a view schematically illustrating a configuration of a driving device in a vehicle including an internal combustion engine in which the present invention is applied.

Hereinafter, with reference to the drawings, a preferable embodiment of the present invention will be described in detail. As illustrated in FIG. 1, a vehicle V is a hybrid vehicle including an internal combustion engine (hereinafter, will be referred to as "engine", and it is referred to as "ENG" in FIG. 1) 1 which serves as a driving source, and an electric motor (hereinafter, will be referred to as "motor") 61 which functions as a driving source and a generator. The vehicle V includes a transmission 52 which shifts a driving force of the engine 1 and/or the motor 61.

The motor 61 is connected to a power drive unit (hereinafter, will be referred to as "PDU") 62, and the PDU 62 is connected to a high-voltage battery 63. When the motor 61 is driven with positive driving torque, that is, when the motor 61 is driven with electricity output from the high-voltage battery 63, the electricity output from the high-voltage battery 63 is supplied to the motor 61 via the PDU 62. In addition, when the motor 61 is driven with negative driving torque, that is, when the motor 61 is subjected to a regenerative operation, electricity generated by the motor 61 is supplied to the high-voltage battery 63 via the PDU 62, thereby charging the high-voltage battery 63.

The PDU 62 is connected to an electronic control unit (hereinafter, will be referred to as "ECU") 20. Under the control of the ECU 20, the operation of the motor 61 is controlled, and charging and discharging of the high-voltage battery 63 are controlled. The ECU 20 is configured to have an engine control ECU and a motor control ECU (neither is illustrated) which are connected through a communication bus.

The transmission 52 is a so-called dual clutch transmission which is coupled to a crankshaft 51 of the engine 1 via a clutch for odd-number gears and a clutch for even-number gears (neither is illustrated). The transmission 52 shifts the driving force transmitted from the engine 1 through an odd-number gear stage or an even-number gear stage. The shifted driving force is transmitted to driving wheels 56 via an output shaft 53 of the transmission 52, a differential gear mechanism 54, and a drive shaft 55, and the vehicle V is driven by means of the transmitted driving force.

In accordance with the configuration described above, the vehicle V has driving modes such as an engine driving mode in which the vehicle V is driven by only the engine 1, a motor driving mode in which the vehicle V is driven by only the motor 61 in a state in which the two clutches of the transmission 52 are disconnected, and a hybrid driving mode in which the vehicle V is driven by both the engine 1 and the motor 61.

Figure 2:
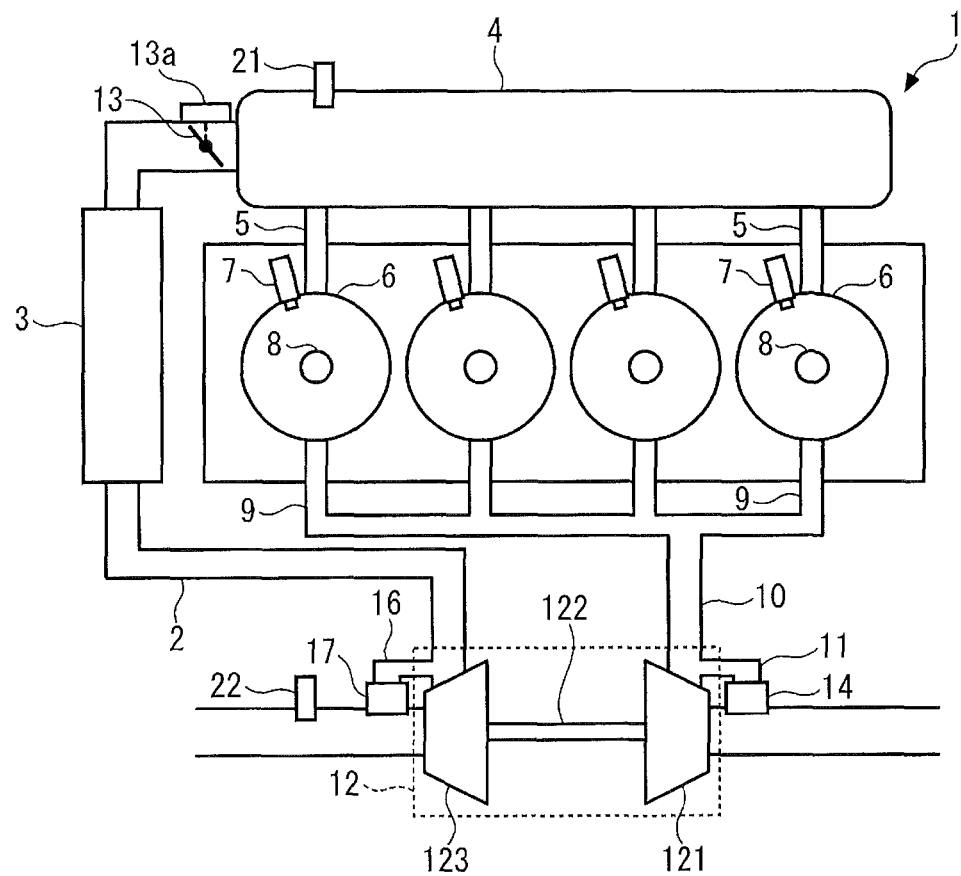
FIG. 2 is a view schematically illustrating a configuration of the internal combustion engine.

As illustrated in FIG. 2, for example, the engine 1 is a direct-injection engine which has four cylinders 6 arranged in series and in which fuel is directly injected into combustion chambers (not illustrated) of the cylinders 6. Each of the cylinders 6 is provided with a fuel injection valve 7, an ignition plug 8, and an intake valve and an exhaust valve (neither is illustrated).

In addition, the engine 1 includes an intake passage 2, an exhaust passage 10, and a turbocharger 12 serving as a supercharger. The intake passage 2 is connected to a surge tank 4, and the surge tank 4 is connected to each of the combustion chambers of the cylinders 6 respectively via intake manifolds 5. The intake passage 2 is provided with a compressor 123 of the turbocharger 12 (will be described below), an intercooler 3 for cooling air pressurized by the turbocharger 12, and a throttle valve 13, in this order from the upstream side. The throttle valve 13 is driven by a throttle (TH) actuator 13a. The surge tank 4 is provided with an intake pressure sensor 21 detecting intake pressure PB, and the intake passage 2 is provided with an intake air amount sensor 22 detecting an intake air amount GAIR.

The turbocharger 12 includes a turbine 121 which is provided in the exhaust passage 10 and is rotatively driven by means of running energy from exhaust gas, and the compressor 123 which is provided in the intake passage 2 and is coupled to the turbine 121 via a shaft 122. The compressor 123 pressurizes air (intake air) taken into the engine 1, thereby performing supercharging. A bypass passage 16 bypassing the compressor 123 is connected to the intake passage 2. The bypass passage 16 is provided with an air bypass valve (hereinafter, will be referred to as "AB valve") 17 for regulating the flow rate of air passing through the bypass passage 16.

The exhaust passage 10 is connected to each of the combustion chambers of the cylinders 6 via exhaust manifolds 9. A bypass passage 11 bypassing the turbine 121 is connected to the exhaust passage 10. A connection portion of the bypass passage 11 on the downstream side is provided with a waste gate valve (hereinafter, will be referred to as "WG valve") 14 for regulating supercharging pressure by regulating the flow rate of exhaust gas passing through the bypass passage 11.

Figure 3:
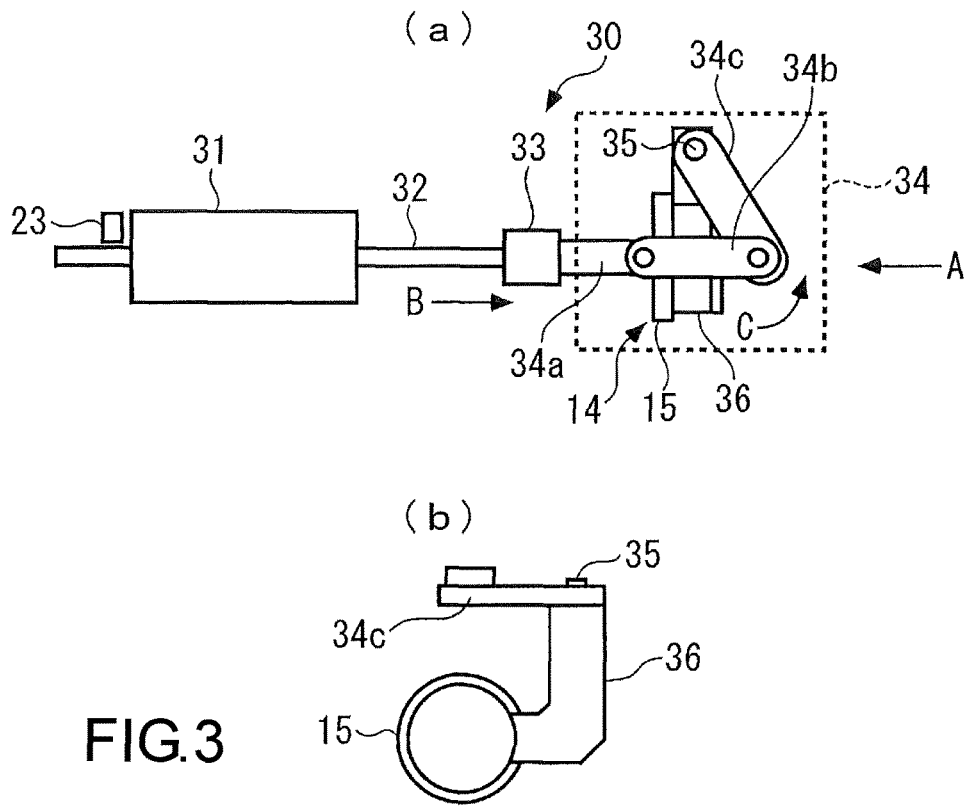
FIG. 3 is a view schematically illustrating a waste gate valve and a driving mechanism thereof.

As illustrated in FIG. 3, a driving mechanism 30 driving the WG valve 14 includes a motor 31 serving as an actuator, a rod 32, a heat shielding member 33, and a link mechanism 34 coupled to a valve body 15 of the WG valve 14. For example, the motor 31 is configured as a DC motor. Under the control of the ECU 20, the motor 31 switches between the normal rotation and the reverse rotation in accordance with the orientation of electrification, and the torque of the motor 31 is controlled in accordance with a duty ratio (hereinafter, will be referred to as "electrification duty ratio") Iduty of a driving pulse for electrification.

In addition, a female screw (not illustrated) is formed in a rotor of the motor 31, and a male screw screwed into the female screw is formed in the rod 32. Due to this configuration, rotation of the motor 31 is converted into linear motion of the rod 32, so that the rod 32 moves to the right or to the left in FIG. 3 in accordance with the rotation direction of the motor 31.

The link mechanism 34 includes a coupling member 34a which is coupled to the rod 32 via the heat shielding member 33, and a first link material 34b and a second link material 34c which are subjected to pin-connection with respect to the coupling member 34a in this order. The second link material 34c is rotatably supported by a rotary shaft 35. In addition, a holding member 36 is integrally provided in the second link material 34c, and the valve body 15 of the WG valve 14 is integrally held by the holding member 36 (refer to FIG. 3(b)).

FIG. 3(a) illustrates a valve closed state of the WG valve 14, that is, a state in which the WG valve 14 blocks the bypass passage 11. From this valve closed state, when the motor 31 is electrified with a current toward a predetermined orientation, the motor 31 is rotatively driven in a predetermined direction in response to the electrification, and the rod 32 screwed to the rotor thereof moves in an arrow B direction in FIG. 3. Consequently, the second link material 34c of the link mechanism 34, and the holding member 36 and the valve body 15 which are integrated with the second link material 34c turn in an arrow C direction about the rotary shaft 35, thereby opening the WG valve 14.

From this valve open state, when the motor 31 is electrified with a current toward a reverse orientation thereof, the motor 31 is rotatively driven in the reverse direction, and the rod 32 moves in a direction opposite to the arrow B. Consequently, the link mechanism 34 is operated in the reverse direction thereof. Then, the second link material 34c, the holding member 36, and the valve body 15 turn in a direction opposite to the arrow C, and the WG valve 14 returns to the valve closed state. Hereinafter, the electrification duty ratio Iduty of when the WG valve 14 is driven to the valve open side as described above will be defined as "positive", and the electrification duty ratio Iduty of when the WG valve 14 is driven to the valve closed side will be defined as "negative".

Therefore, when the electrification duty ratio Iduty is negative, the WG valve 14 is driven toward a fully closed position. When the absolute value thereof is greater, the force pressing the valve body 15 to a valve seat (not illustrated) at the time of closing the valve becomes stronger. In addition, since the rotor of the motor 31 is screwed to the rod 32, the electrification duty ratio Iduty becomes zero, and when the motor 31 stops rotating, the WG valve 14 maintains the opening degree at the time of the stop.

In addition, a valve opening degree sensor 23 is provided in an end portion of the rod 32 on a side opposite to the valve body 15. The valve opening degree sensor 23 detects a position of the rod 32 in an axial line direction (arrow B direction), thereby detecting an opening degree (hereinafter, will be referred to as "detected opening degree") WGA of the WG valve 14. A driving mechanism (not illustrated) of the AB valve 17 is also configured in a similar manner, and this driving mechanism includes a motor for driving the AB valve 17 such that the AB valve 17 is opened or closed, and a valve opening degree sensor for detecting the opening degree of the AB valve 17.

The detected opening degree WGA which is indirectly detected by the valve opening degree sensor 23 via the rod 32 includes errors caused due to aging such as abrasion of configuration components of the driving mechanism 30 present between the valve body 15 and the rod 32, and temperature-dependent errors depending on temperature. In order to compensate for such errors, the fully closed position of the WG valve 14 is learned.

Specifically, the detected opening degree WGA detected when the valve body 15 has reached the fully closed position is learned and stored as a fully closed opening degree learning value WGFC. A value obtained by subtracting the fully closed opening degree learning value WGFC from the detected opening degree WGA obtained thereafter is calculated as an opening degree (hereinafter, will be referred to as "valve opening degree") WGO of the WG valve 14 at that time. In control over the opening degree of the WG valve 14 described below, the valve opening degree WGO learned and corrected as described above is employed.

Figure 4:
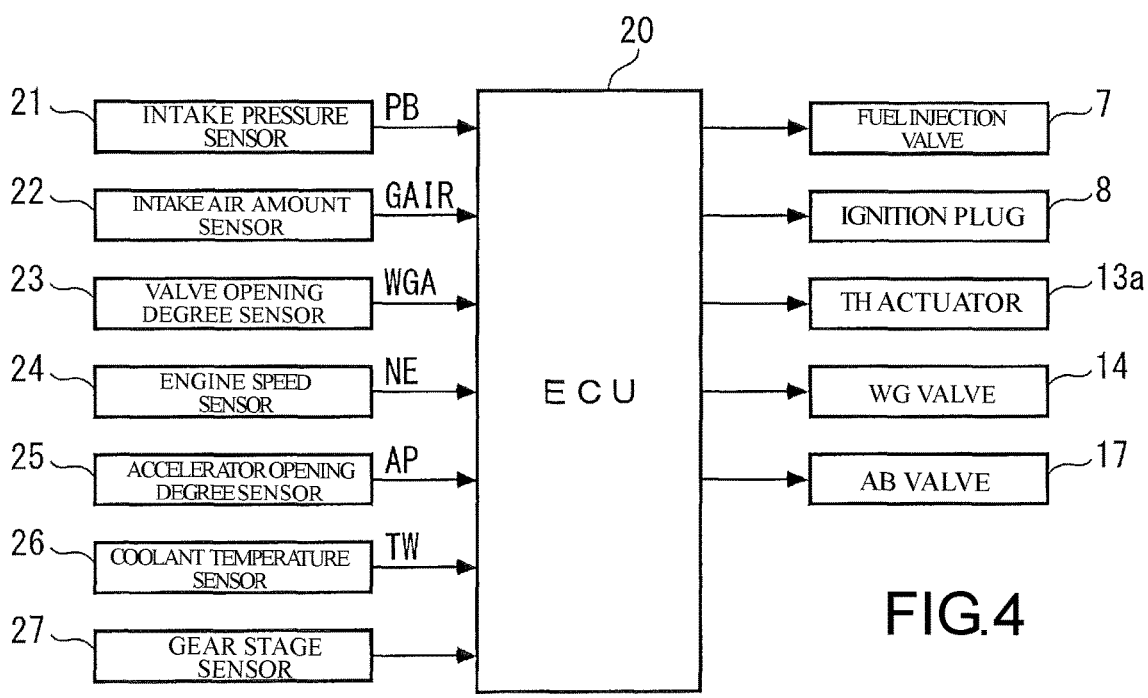
FIG. 4 is a block diagram illustrating a configuration of a control device for an internal combustion engine.

FIG. 4 illustrates a configuration of the control device for an engine 1. In addition to the intake pressure sensor 21, the intake air amount sensor 22, and the valve opening degree sensor 23, an engine speed sensor 24 detecting an engine speed (hereinafter, will be referred to as "engine speed") NE of the engine 1, an accelerator opening degree sensor 25 detecting an operation amount (hereinafter, will be referred to as "accelerator opening degree") AP of an accelerator pedal of the vehicle V, a coolant temperature sensor 26 detecting a temperature (hereinafter, will be referred to as "engine coolant temperature") TW of the coolant for the engine 1, a gear stage sensor 27 detecting a gear stage set in the transmission 52, and the like are connected to the ECU 20. Detection signals thereof are input to the ECU 20. The fuel injection valve 7, the ignition plug 8, the TH actuator 13a, the WG valve 14 (motor 31), and the AB valve 17 (motor) are connected to an output side of the ECU 20.

The ECU 20 is configured as a microcomputer constituted by a CPU, a RAM, a ROM, and an input interface (none is illustrated). The ECU 20 determines the driving mode of the vehicle V in accordance with the detection signals or the like of the various sensors 21 to 27 described above and controls the engine 1 and the motor 61 in accordance with the determined driving mode.

In addition, as control over the engine 1, the ECU 20 performs fuel injection control for the fuel injection valve 7, ignition control for the ignition plug 8, intake air amount control for the throttle valve 13, supercharging pressure control for the WG valve 14, and the like in accordance with the running state (mainly, engine speed NE and required torque TRQD) of the engine 1. The required torque TRQD is calculated in accordance with mainly the accelerator opening degree AP so as to be greater when the accelerator opening degree AP increases. In the embodiment, the ECU 20 corresponds to a control unit.

Figure 5:
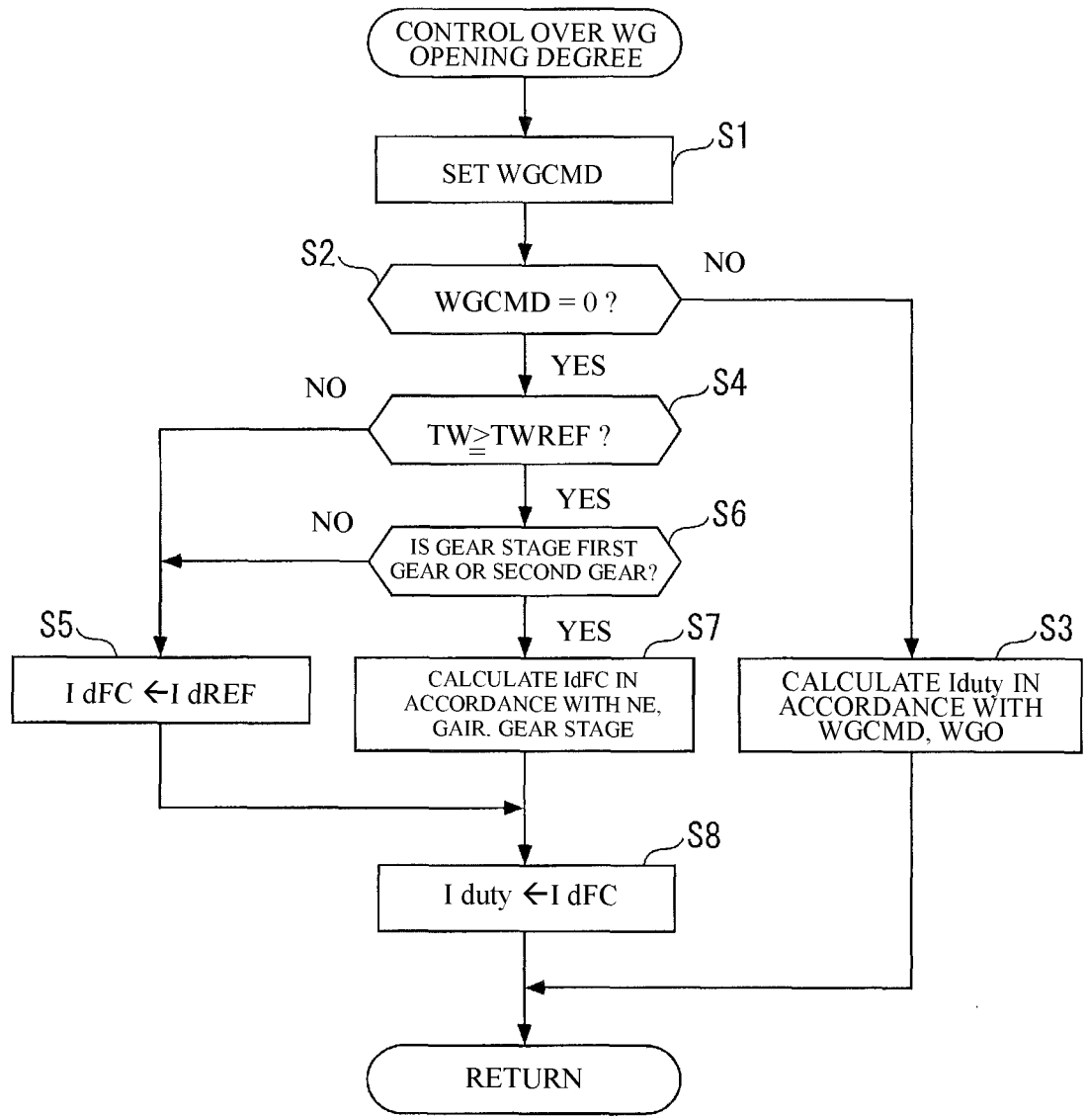
FIG. 5 is a flowchart illustrating processing of control over an opening degree of the waste gate valve.

FIG. 5 is a flowchart of processing of executing control over an opening degree of the WG valve 14. This processing is repetitively executed by the ECU 20 at predetermined times.

In this processing, first, in Step 1 (illustrated as "S1", hereinafter, the same will apply), a target opening degree WGCMD of the WG valve 14 is set. The target opening degree WGCMD is set in accordance with mainly the required torque TRQD and the engine speed NE, and additionally, in accordance with a gear stage state of the transmission 52. For example, when the transmission 52 is subjected to an acceleration gear shift (shift-up), in order to lower the engine speed NE which is an input side of the transmission 52, such that the engine speed NE follows the engine speed corresponding to the gear ratio of the gear stage after the gear shift, there is a need to perform torque down control for temporarily lowering the torque of the engine 1. In order to lower the supercharging pressure as the torque down control, the target opening degree WGCMD is temporarily set to the valve open side.

Next, the ECU 20 verifies whether or not the set target opening degree WGCMD is zero (fully closed opening degree) (Step 2). When the answer is NO, the electrification duty ratio Iduty is calculated in Step 3, thereby ending this processing. The electrification duty ratio Iduty is calculated by means of feedback control (for example, PID control) such that the valve opening degree WGO of the WG valve 14 coincides with the target opening degree WGCMD.

When the answer in Step 2 is YES and the target opening degree WGCMD is zero, the ECU 20 verifies whether or not the detected engine coolant temperature TW is equal to or higher than a predetermined temperature TWREF (for example, 60° C.) indicating a warming-up state of the engine 1 (Step 4). When the answer is NO and the engine 1 is not in a warming-up state, precise torque control by means of supercharging pressure cannot be performed due to significant friction or the like in the engine 1, and an electrification duty ratio IdFC for the time of fully closed control (hereinafter, "fully closed period duty ratio") is set to a predetermined value IdREF (Step 5), thereby ending this processing. The predetermined value IdREF is set to a value with which the WG valve 14 can be reliably pressed to the fully closed position.

When the answer in Step 5 is YES and the engine 1 is in a warming-up state, the ECU 20 verifies whether or not the gear stage of the transmission 52 detected by the gear stage sensor 27 is the first gear or the second gear (Step 6). When the answer is NO and the gear stage is the third gear or higher, not much valve opening responsiveness of the WG valve 14 is required. Therefore, the processing proceeds to Step 5, and the fully closed period duty ratio IdFC is set to the predetermined value IdREF.

Figure 6:
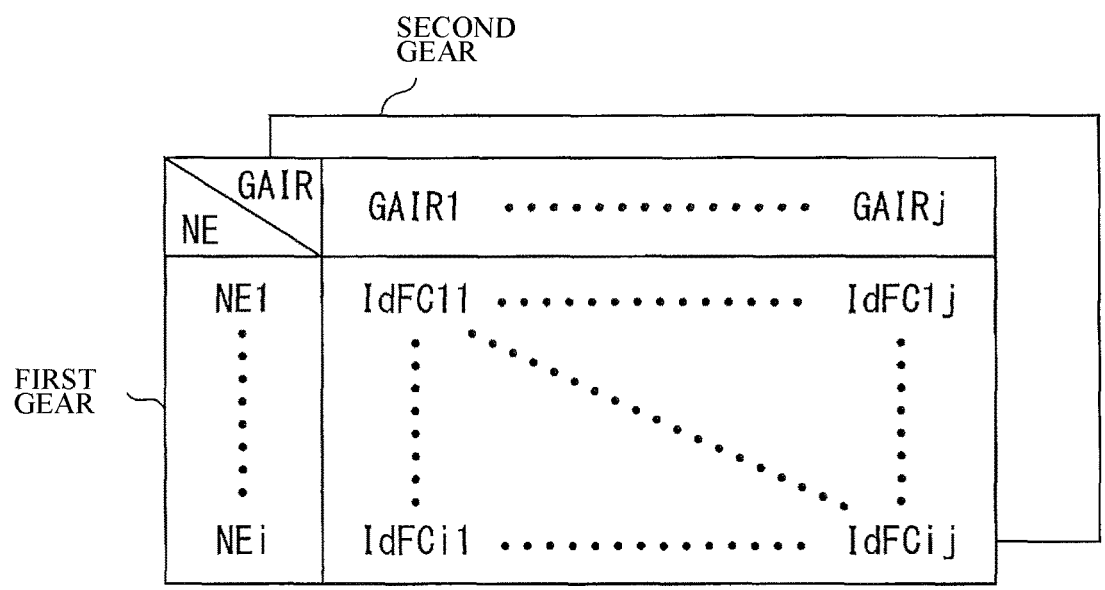
FIG. 6 is a map of fully closed period electrification, used for setting a fully closed period duty ratio, in processing of FIG. 5.

Meanwhile, when the answer in Step 6 is YES and the gear stage of the transmission 52 is the first gear or the second gear, the processing proceeds to Step 7. Then, a map of fully closed period electrification in FIG. 6 is searched for in accordance with the engine speed NE, the intake air amount GAIR, and the gear stage of the transmission 52, thereby calculating the fully closed period duty ratio IdFC. In Step 8 following Step 7 or Step 5, the calculated fully closed period duty ratio IdFC is set as the electrification duty ratio Iduty, thereby ending this processing.

As illustrated in FIG. 6, the map of fully closed period electrification is configured to include two maps for first gear and second gear. In each of the maps, with respect to combinations of i predetermined values NE1 to NEi for the engine speed and j predetermined values GAIR1 to GAIRj of the intake air amount, in view of both prevention of vibration of the WG valve 14 in a fully closed state and the valve opening responsiveness required for the WG valve 14, electrification duty ratios Iduty suitable for the combinations are obtained in advance through experiments or the like, and the results are set as the fully closed period duty ratios IdFC. When the engine speed NE coincides with none of the predetermined values NE1 to NEi, and/or when the intake air amount GAIR coincides with none of the predetermined values GAIR1 to GAIRj, the fully closed period duty ratio IdFC is obtained through interpolation calculation.

The relationship among the engine speed NE, the intake air amount GAIR, the fully closed period duty ratio IdFC in each of the maps of fully closed period electrification is as follows. First, when the engine speed NE increases, the fully closed period duty ratio IdFC is set to a greater value. The reason is that when the engine speed NE is low, the WG valve 14 is likely to vibrate, and when the engine speed NE becomes high, the valve opening responsiveness required for the WG valve 14 increases.

Figure 7:
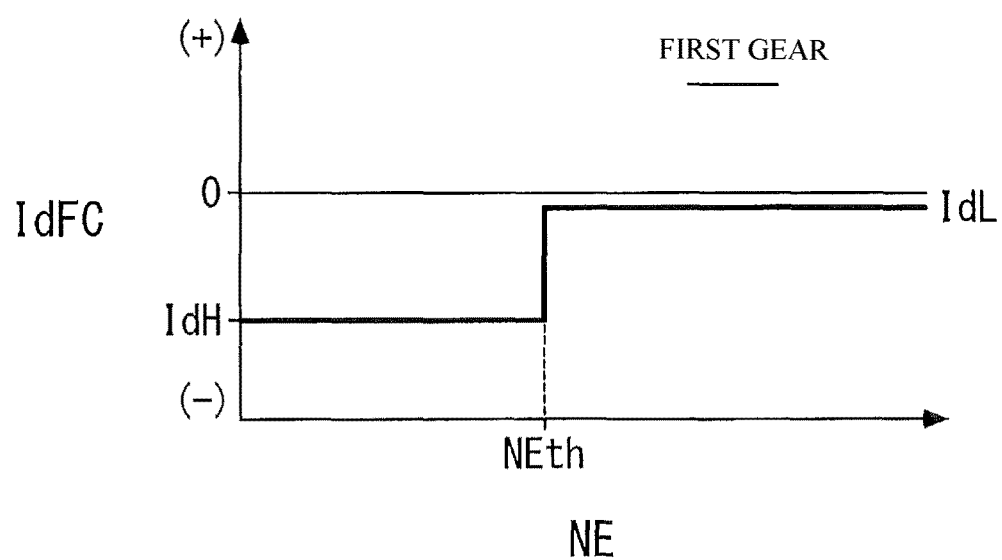
FIG. 7 is a table illustrating a part of the map of fully closed period electrification in FIG. 6, in regard to a relationship between an engine speed and the fully closed period duty ratio.

For example, FIG. 7 illustrates a table extracted for the map of fully closed period electrification for first gear in FIG. 6, in regard to a representative relationship between the engine speed NE and the fully closed period duty ratio IdFC when the engine speed NE increases or decreases in a state in which the gear stage of the transmission 52 is the first gear. As illustrated in FIG. 7, in this relationship, when the engine speed NE is equal to or lower than a predetermined engine speed NEth, the fully closed period duty ratio IdFC is set to a first predetermined value IdH (for example, −50%) for a valve open non-standby period, which is a negative value having a large absolute value. When the engine speed NE is higher than the predetermined engine speed NEth, the fully closed period duty ratio IdFC is set to a second predetermined value IdL (for example, −5%) for a valve open standby period, which is a negative value close to the value of zero.

In addition, in each of the maps of fully closed period electrification, when the intake air amount GAIR increase, the absolute value of the second predetermined value IdL for a valve open standby period and is set to a smaller negative value (not illustrated). The reason is that in a high-rotation region, when the load on the engine 1 increases, the supercharging pressure further increases, and the valve opening responsiveness required for the WG valve 14 further increases. Moreover, when the load on the engine 1 increases, the WG valve 14 is more likely to vibrate. Therefore, the first predetermined value IdH for a valve open non-standby period is set to a negative value having a greater absolute value (not illustrated).

Figure 8:
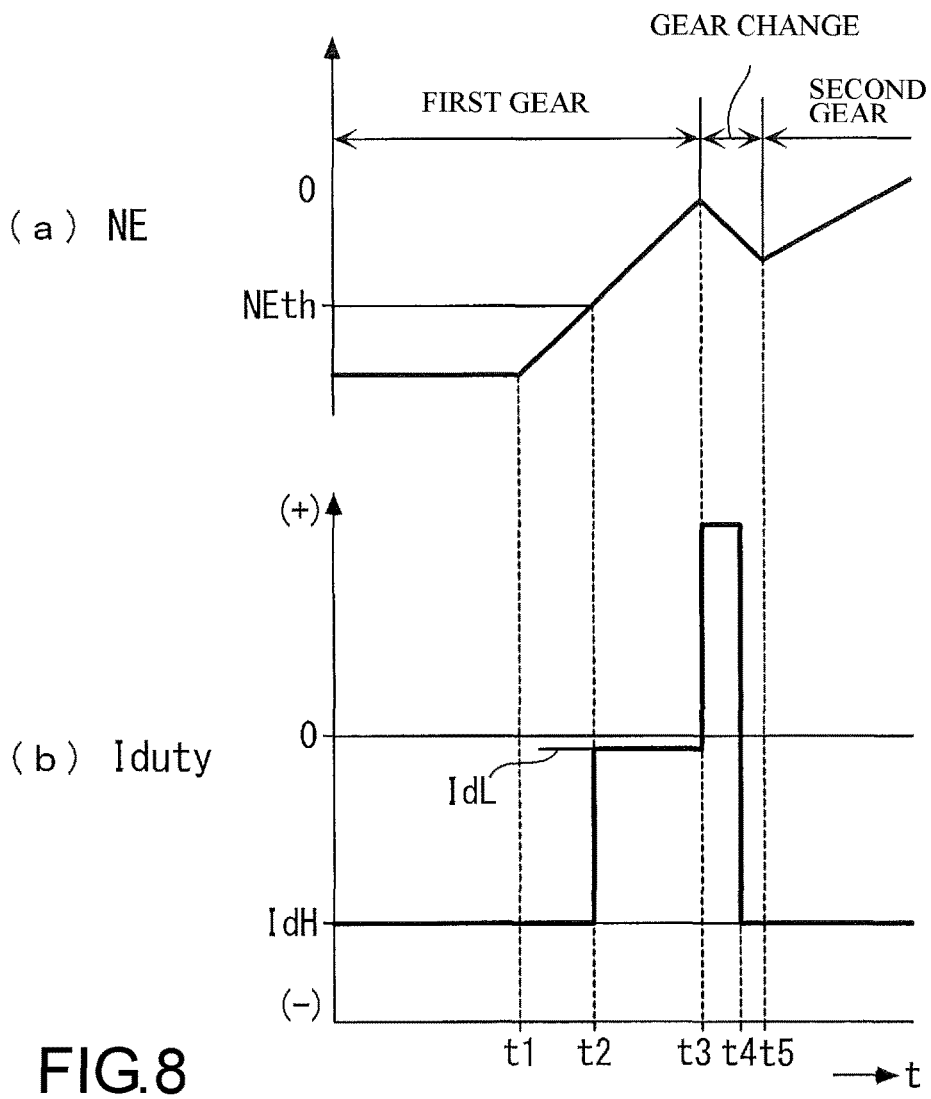
FIG. 8 is a timing chart illustrating an operational example obtained through the processing in FIG. 5.

Next, with reference to FIG. 8, an operational example obtained through the above-described control over the opening degree of the WG valve 14 in FIG. 5 will be described, in regard to a case in which the gear stage of the transmission 52 is shifted from the first gear to the second gear (shifted up). FIGS. 8(a) and 8(b) respectively illustrate the transitions of the engine speed NE and the electrification duty ratio Iduty of the motor 31 at this time.

Before the time t1, the gear stage of the transmission 52 is set to the first gear, and the engine speed NE is in a relatively low constant state. In accordance therewith, the WG valve 14 is controlled to be in a fully closed state, and the electrification duty ratio Iduty is controlled to have the first predetermined value IdH. Accordingly, a relatively significant counter electromotive force is generated in the motor 31, and the WG valve 14 is in a state of being strongly pressed to the fully closed position.

From this state, when the accelerator pedal is stepped on at the time t1, the engine speed NE increases, and the supercharging pressure increases in accordance therewith. In this case, for example, based on the relationship illustrated in FIG. 7, the electrification duty ratio Iduty is maintained to have the first predetermined value IdH until the engine speed NE reaches the predetermined engine speed NEth (time t2). After the engine speed NE exceeds the predetermined engine speed NEth, the electrification duty ratio Iduty is controlled to have the second predetermined value IdL (t2 to t3). Accordingly, the counter electromotive force generated in the motor 31 in a fully closed state is reduced, and a pressing force pressing the WG valve 14 to the fully closed position s extremely reduced.

Thereafter, when the transmission 52 starts a gear shift operation (gear change) from the first gear to the second gear at the time t3, in order to lower the supercharging pressure as the torque down control for following the engine speed for the second gear to which the transmission 52 is to be shifted, the electrification duty ratio Iduty is controlled to have a greater positive value, and an operation of opening the WG valve 14 starts. At this point of time, the electrification duty ratio Iduty is controlled to have the second predetermined value IdL, and the counter electromotive force which has been generated in the motor 31 is in a state of being already reduced. Therefore, the WG valve 14 is opened with preferable responsiveness, and the increased supercharging pressure is promptly lowered.

Thereafter, at the point of time when following the engine speed for the second gear of the transmission 52 ends and the meshing of the gears (in-gear) is confirmed (time t4), for example, the electrification duty ratio Iduty returns to the first predetermined value IdH. Moreover, when the clutch for even-number gears is connected, the gear shift operation from the first gear to the second gear is completed (time t5), and the gear stage shifts to the second gear.

As described above, according to the present embodiment, in a case in which the WG valve 14 is controlled to be in the fully closed state, the fully closed period duty ratio IdFC which is an electrification duty ratio of the motor 31 at that time is controlled to have a greater first predetermined value IdH for a valve open non-standby period when the engine speed NE is equal to or lower than the predetermined engine speed NEth. Accordingly, when a pressing force pressing the WG valve 14 to the fully closed position is increased, the WG valve 14 can be prevented from vibrating. Therefore, disadvantages caused due to vibration of the WG valve 14, for example, generation of noise and deterioration of the WG valve 14 and the like caused due to contact with other members, can be reliably prevented.

In addition, when the engine speed NE is higher than the predetermined engine speed NEth, the fully closed period duty ratio IdFC is controlled to have the second predetermined value IdL for a valve open standby period close to the value of zero, and a pressing force to the WG valve 14 is reduced. Therefore, it is possible to suppress consumption of electricity of the motor 31 and to prevent vibration of the WG valve 14 and disadvantages caused due to the vibration thereof. Moreover, when the fully closed period duty ratio IdFC is controlled to have the second predetermined value IdL, an operation of opening the WG valve 14 is performed from a fully closed state in which a small counter electromotive force is generated in the motor 31. Therefore, the valve opening responsiveness of the WG valve 14 can be improved. Consequently, increased supercharging pressure can be promptly lowered, and overshooting of the supercharging pressure exceeding an upper limit value can be prevented.

In addition, the fully closed period duty ratio IdFC is controlled in accordance with the intake air amount GAIR. Specifically, when the intake air amount GAIR increases, the second predetermined value IdL of the fully closed period duty ratio IdFC is set to a negative value having a smaller absolute value. Accordingly, in the high-rotation region, the valve opening responsiveness of the WG valve 14 can be suitably increased in accordance with an increase of the supercharging pressure increasing in response to an increase of the load on the engine 1. In addition, when the intake air amount GAIR increases, the first predetermined value IdH of the fully closed period duty ratio IdFC is set to a negative value having a greater absolute value. Therefore, it is possible to suitably prevent vibration of the WG valve 14 which is likely to occur in a low-rotation and high-load state.

Moreover, the fully closed period duty ratio IdFC is controlled in accordance with the gear stage of the transmission 52, Specifically, when the gear stage of the transmission 52 is the first gear or the second gear, the fully closed period duty ratio IdFC is set using the map in FIG. 6, and when the gear stage is a different gear, the fully closed period duty ratio IdFC is set to the predetermined value IdREF. Accordingly, in the first gear and the second gear particularly requiring the valve opening responsiveness of the WG valve 14, the fully closed period duty ratio IdFC can be set minutely and effectively. In other gear stages that do not require not much valve opening responsiveness, it is possible to reliably achieve prevention of vibration of the WG valve 14.

Figure 9:
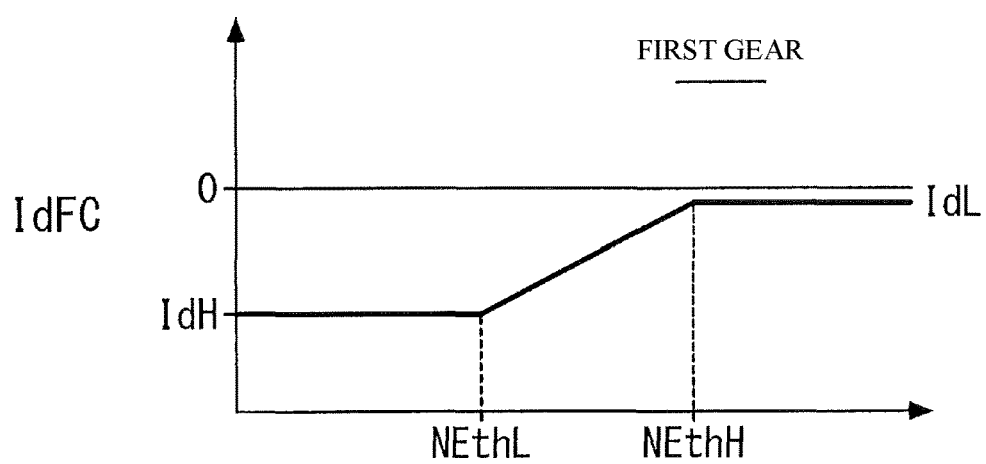
FIG. 9 is a table according to a modification example, similar to that in FIG. 7.

The present invention is not limited to the embodiment described above and can be executed in various aspects. For example, in the embodiment, the representative relationship between the engine speed NE and the fully closed period duty ratio IdFC is set to two stages (stepped state) as illustrated in FIG. 7. However, the present invention is not limited thereto. For example, as illustrated in FIG. 9, the fully closed period duty ratio IdFC may be set to the first predetermined value IdH in a case of engine speed NE≤first predetermined engine speed NEthL. The fully closed period duty ratio IdFC may be set to the second predetermined value IdL in a case of NE≥second predetermined engine speed NEthH (>NEthL). The fully closed period duty ratio IdFC may be set such that the first predetermined value IdH and the second predetermined value IdL are connected in a straight line in a case of being between the first and second predetermined engine speeds NEthL and NEthH.

In addition, in the embodiment, setting of the fully closed period duty ratio IdFC using the map in FIG. 6 is carried out when the gear stage of the transmission 52 is the first gear or the second gear. However, the present invention is not limited thereto. The fully closed period duty ratio IdFC may be set only at the time of the first gear requiring the most valve opening responsiveness of the WG valve 14 or may be set at the time of the third gear or higher, in addition to the first gear and the second gear.

Moreover, the intake air amount GAIR is employed as a parameter indicating the load on the engine 1. However, in place thereof, detected intake pressure PB or a detected accelerator opening degree AP may be employed. Otherwise, required torque TRQD or the like may be employed.

In addition, the driving mechanism 30 driving the WG valve 14 is configured to include the motor 31 serving as an actuator, a mechanism converting rotation of the motor 31 into linear motion of the rod 32, the link mechanism 34 opening and closing the valve body 15 in accordance with the reciprocating motion of the rod 32, and the like. However, the basic configuration and the configurations of details of the driving mechanism are arbitrary as long as the waste gate valve is electrically driven. For example, a direct drive motor or an electromagnetic actuator may be employed as the actuator, in place of the rotary motor in the embodiment.

Moreover, the embodiment illustrates an example of an engine which is mounted in a hybrid vehicle together with an electric motor. However, the present invention is not limited thereto and may be applied to engines for a car having no electric motor. In addition, the present invention can be applied to engines other than engines for a car, for example, engines for a ship propeller such as outboard engines in which a crankshaft is vertically disposed. Furthermore, the configurations of the details can be suitably changed within the scope of the gist of the present invention.

What is claimed is:

1. A control device for an internal combustion engine having a supercharger which supercharges intake air, and a waste gate valve which is provided in a bypass passage bypassing a turbine of the supercharger and regulates supercharging pressure generated by the supercharger, the control device comprising:
    an engine speed sensor for detecting an engine speed of the internal combustion engine;
    an electric actuator for driving the waste gate valve; and
    a controller for controlling an opening degree of the waste gate valve by controlling an electrification amount of the actuator,
    wherein the controller controls a fully closed period electrification amount, which is an electrification amount of the actuator when the opening degree of the waste gate valve is controlled to be in a fully closed state, such that the fully closed period electrification amount is maintained at a smaller value when the detected engine speed of the internal combustion engine increases over a predetermined speed.

2. The control device for an internal combustion engine according to claim 1, further comprising:
    an intake air amount sensor for detecting a load on the internal combustion engine,
    wherein the controller also controls the fully closed period electrification amount in accordance with the detected load on the internal combustion engine.

3. The control device for an internal combustion engine according to claim 1,
    wherein the internal combustion engine is connected to a stepped automatic transmission,
    wherein the control device further comprises:
        a gear stage sensor for acquiring a gear stage set in the automatic transmission, and
    wherein the controller also controls the fully closed period electrification amount in accordance with the acquired gear stage.

4. The control device for an internal combustion engine according to claim 2,
    wherein the internal combustion engine is connected to a stepped automatic transmission,
    wherein the control device further comprises:
        a gear stage sensor for acquiring a gear stage set in the automatic transmission, and
    wherein the controller also controls the fully closed period electrification amount in accordance with the acquired gear stage.

* * * * *